United States Patent [19]

Nathansohn et al.

[11] 3,846,412

[45] Nov. 5, 1974

[54] DIHYDRO-2-AMINO-ISOQUINOLINES AND THEIR DERIVATIVES

[75] Inventors: Giangiacomo Nathansohn; Giorgio Winters; Gianfranco Odasso, all of Milan, Italy

[73] Assignee: Gruppo Lepetit S.p.A., Milan, Italy

[22] Filed: Dec. 6, 1972

[21] Appl. No.: 312,579

Related U.S. Application Data

[63] Continuation-in-part of Ser. No. 232,204, March 6, 1972, abandoned.

[30] Foreign Application Priority Data

Mar. 18, 1971   Italy ................................... 21931/71

[52] U.S. Cl. ......... 260/240 G, 424/258, 260/287 R, 260/288 R, 260/469, 260/487, 260/558 H, 260/562 H

[51] Int. Cl. ........................................... C07d 33/52

[58] Field of Search ......... 260/288 R, 287 R, 240 G

[56] References Cited

UNITED STATES PATENTS

| | | | |
|---|---|---|---|
| 3,037,984 | 6/1962 | Biel | 260/288 R X |
| 3,051,707 | 8/1962 | Biel | 260/288 R X |
| 3,480,634 | 11/1969 | Finkelstein | 260/288 R X |

OTHER PUBLICATIONS

Biel et al., J. Am. Chem. Soc. vol. 82, pp. 2204 to 2208 (1960).
Wolbing, Ber. Deut. Chem. Vol. 38, pp. 3845–3853 (1905).
Lieck, Ber. Deut. Chem. vol. 38, pp. 3853 to 3856 (1905).
Beilstein's Hanbuck der Organischen Chemie, 4th Ed., Vol. 21, (Mainwerke), page 289 (system No. 3183), Berlin, Germany, (1935), (photo–lithoprint reproduction–1944).

*Primary Examiner*—John D. Randolph
*Attorney, Agent, or Firm*—Theodore Post

[57] ABSTRACT

New heterocyclic compounds, dihydro-2-aminoisoquinolines of the formula

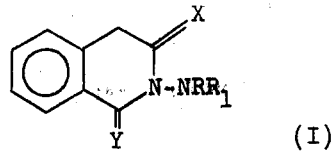

(I)

hydroxy-lower alkyl, lower alkyl, phenyl lower alkenyl, substituted phenyl, lower alkynyl; acyl lower alkylsulfonyl or Carbalkoxy-lower
and a process for their preparation. In Formula (I), X and Y are different and represent $H_2$ or oxygen; R and $R_1$ independently represent hydrogen, lower alkyl, hydroxy-lower alkyl, amino-lower alkyl, mono- and di-lower alkylamino-lower alkyl, carboxy-lower alkyl, carboalkoxy-lower alkyl, cycloalkyl, lower alkenyl, cycloalkenyl, phenyl, phenyl lower alkyl, phenyl lower alkenyl, substituted phenyl, lower alkynyl; acyl derived from a lower alkyl, a phenyl or a heterocyclic carboxylic acid moiety; carbamyl, thiocarbamyl, phenylcarbamyl, phenylthiocarbamyl, guanyl, phenylsulfonyl, lower alkylsulfonyl or halo lower alkylsulfonyl; or R and $R_1$ taken together with the adjacent nitrogen atom represent a phenyl lower alkylideneamino, substituted phenyl lower alkenylideneamino, lower alkylideneamino, carboxy-lower alkylideneamino, carbolkoxy-lower alkylideneamino, cycloalkylideneamino, phenyl-lower alkenylideneamino radical or form a heterocyclic ring of 5–7 atoms therewith. The pharmaceutically acceptable addition salts of the foregoing compounds of Formula (I) are also included with the scope of this invention. The compounds have anti-inflammatory activity.

10 Claims, No Drawings

DIHYDRO-2-AMINO-ISOQUINOLINES AND THEIR DERIVATIVES

This application is a continuation-in-part of U.S. patent application Ser. No. 232,204, filed Mar. 6, 1972, now abandoned.

SUMMARY OF THE INVENTION

This invention is concerned with new heterocyclic compounds, dihydro-2-aminoisoquinolines of the formula

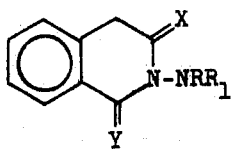
(I)

and a process for their preparation. In Formula (I), X and Y are different and represent $H_2$ or oxygen; R and $R_1$ independently represent hydrogen, lower alkyl, hydroxy-lower alkyl, amino-lower alkyl, mono- and di-lower alkylamino-lower alkyl, carboxy-lower alkyl, carboalkoxy-lower alkyl, cycloalkyl, lower alkenyl, cycloalkenyl, phenyl, phenyl-lower alkyl, phenyl-lower alkenyl, substituted phenyl, lower alkynyl; acyl derived from a lower alkyl, a phenyl or a heterocyclic carboxylic acid moiety; carbamyl, thiocarbamyl, phenylcarbamyl, phenylthiocarbamyl, guanyl, phenylsulfonyl, lower alkylsulfonyl or halo-lower alkyl-sulfonyl; or R and $R_1$ taken together with the adjacent nitrogen atom represent a phenyl lower alkylideneamino, substituted phenyl-lower alkylideneamino, lower alkylideneamino, carboxy lower alkylideneamino, carbalkoxy lower alkylideneamino, cycloalkylideneamino, phenyl-lower alkenylideneamino radical or form a heterocyclic ring of 5-7 atoms therewith. The pharmaceutically acceptable addition salts of the foregoing compounds of Formula (I) are also included within the scope of this invention.

The terms "lower alkyl" and the "alkyl" moiety in the compound terms as employed in the specification and claims designate straight and branched chain aliphatic groups of from 1 to 8 carbon atoms, such as, for example, methyl through octyl; the terms "lower alkenyl," "lower alkylidene," "lower alkynyl" and "lower alkenylidene" designate 2 to 8 carbon straight and branched chain alkenyl, alkylidene, alkynyl and alkenylidene groups; the terms "phenyl" and "substituted phenyl" by themselves and as moieties designate, respectively, phenyl and phenyl substituted by halogen, nitro, amino, cyano, lower alkoxy, hydroxy, carboxy, N-carbalkoxy, trifluoromethyl, sulfamoyl or lower alkyl groups; the terms "cycloalkyl," "cycloalkenyl" and "cycloalkylidene" designate respective aliphatic rings containing 5 to 8 carbon atoms; the terms "heterocyclic" and "heterocyclic ring of 5-7 atoms" designate hetero ring compounds containing in addition to the $NRR_1$ nitrogen up to one other hetero atom selected from nitrogen, oxygen and sulfur.

The compounds of the invention are prepared by contacting a lower alkyl 2-(ω-haloalkyl)-benzoate or a lower alkyl 2-(ω-haloalkyl)phenylacetate with a large molar excess of hydrazine in a suitable organic solvent such as, for example, one of the lower alkanols at a temperature at which hydrogen chloride is liberated and forms the hydrochloride with the excess hydrazine, advantageously at the boiling temperature of the solvent for 1-20 hours. The reaction may be represented graphically as follows:

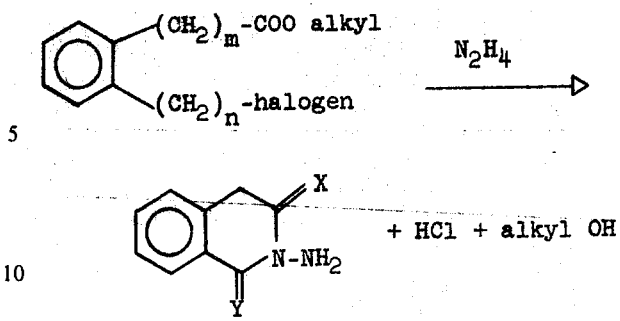

In the equation, when $m=n=1$, the compound in which X is oxygen and Y is $H_2$ is obtained, and when $m=0$ and $n=2$, the compound in which X is $H_2$ and Y is oxygen is obtained.

The dihydro-2-aminoisoquinolines prepared as described above are, if desired, subjected to further treatment, in order to modify the amino group bound to the heterocyclic ring. These modifications are carried out according to conventional methods, and lead to the formation of derivative compounds, which are also contemplated as being within the scope of the invention.

For instance, introduction of lower alkyl groups into the amino group may be effected by treatment of the aminoisoquinoline with an alkyl halide or, when the lower alkyl is methyl, with a mixture of formic acid and formaldehyde. The same process is obviously applicable when a phenyl or phenylalkyl group is to be introduced. When in the alkylation process a terminal dihalo derivative is employed, the resulting end compound falls within the scope of Formula (I) wherein R and $R_1$ form a heterocyclic ring with the nitrogen atom.

On the other hand, hydroxy-lower alkylamino derivatives are prepared from the amine and a lower alkylene oxide. Carboxylic acid acyl and sulfonyl derivatives are best prepared by the methods commonly used for preparing amides, e.g., by treating the amine with the desired carboxylic acid acyl halide or sulfonyl halide in the presence of a basic substance. Phenyl-alkylidene, alkylidene, phenyl-alkenylidene and cycloalkylidene derivatives, i.e., the so-called Schiff bases, are prepared from the amine and the corresponding carbonyl compound by conventional procedures. The Schiff bases can thereafter be hydrogenated by various methods to the above-indicated alkyl and phenyl-alkylamino and cycloalkylamino derivatives.

In some instances, a suitable method for preparing the mono-lower alkyl derivative consists in the N-alkylation of the benzenesulfonamide compound by means of usual alkylating agents such as dialkyl sulfates or alkyl halides in the presence of an acid acceptor, followed by hydrolysis of the benzenesulfonyl group.

The carbamyl, thiocarbamyl, phenylcarbamyl and phenylthiocarbamyl derivatives are prepared from isocyanates or isothiocyanates and the amine.

Another method which is useful for preparing compounds of Formula (I) where at least one of the substituents R and $R_1$ is different from hydrogen consists in heating a hydrazine of the formula

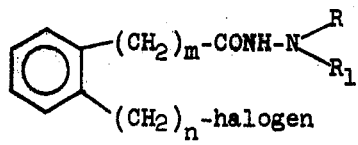

wherein R, R₁, m and n have the same meaning as before given, but wherein at least one of R and R₁ is not hydrogen. In this case, the intramolecular cyclization takes place with elimination of a hydrogen halide, a strong base such as an alkali metal hydroxide or hydride being required to speed up the reaction. The solvents wherein the reaction is carried out are generally selected from the polar inert organic solvents such as, for instance, dimethoxyethane, acetonitrile and acetone.

A suitable method for preparing compounds of Formula (I) where R is hydrogen and R₁ is lower alkenyl or alkynyl, cycloalkenyl or phenyl-lower alkenyl comprises reacting the corresponding 2-benzenesulfonamido isoquinoline derivative with a lower alkenyl or lower alkynyl, cycloalkenyl or phenyl-lower alkenyl halide, followed by acid hydrolysis of the benzenesulfonamido group.

The compounds wherein both R and R₁ represent lower alkenyl, lower alkyl, cycloalkenyl or phenyl-lower alkenyl may be advantageously prepared by reacting a corresponding 2-amino-isoquinoline derivative with a large excess of a lower alkenyl, lower alkynyl, cycloalkenyl or phenyl-lower alkenyl halide in the presence of a hydrogen halide acceptor. In some instances, depending on the reaction conditions and on the ratio between the two reactants, mixtures of mono and di-substituted aminoisoqinoline derivatives are obtained. The two products can be separated by fractional crystallization or distillation or by chromatography. In general, by using substantially equimolecular proportions of the two reactants, mono-substituted derivatives, i.e., the compounds of Formula (I) wherein R is hydrogen and R₁ is lower alkenyl, lower alkynyl, cycloalkenyl or phenyl-lower alkenyl, are obtained in a practically pure form. These alkylation procedures may also be carried out by using as the starting material compounds of Formula (I) wherein R is hydrogen and R₁ is as previously defined. This latter procedure is particularly useful for obtaining compounds wherein R and R₁ represent different substituents such as, for example, methyl and allyl or ethyl and cinnamyl.

The compounds of this invention exhibit a high degree of anti-inflammatory activity coupled with a low toxicity. Representative members of these novel dihydro-2-aminoisoquinoline compounds when tested on rats displayed carrageenin and granuloma pellet test activity. The compounds were found to be pharmacologically active per os, i.e., they induced an inhibition of at least 20 per cent even at a dose about 10–25 times smaller than the toxic dose, which, in rats, ranges from 500 to more than 1,000 mg/kg per os. For example, the following per cent inhibitions of the carrageenin-induced edema and of the granuloma pellet were found in representative tests:

| Compound of Example No. | LD₅₀ mg/kg p.o. | Dose mg/kg p.o. | % Inhibition of Carrageenin edema | % Inhibition of the Granuloma |
|---|---|---|---|---|
| 1 | 500 | 20 | 20 | — |
|  |  | 50 | 43 | 30 |
|  |  | 100 | 62 | 44.5 |
| 4 | >1000 | 50 | 24.1 | — |
|  |  | 100 | 34.5 | 26 |
|  |  | 200 | 41.8 | 37 |
| 8 | >1000 | 50 | — | 20 |
|  |  | 100 | — | 26 |
|  |  | 200 | 32 | 37 |
| 22 | >1000 | 100 | 20 | — |
|  |  | 200 | 35.5 | — |
| 31 | 500 | 50 | 31 | — |
| 38 | 500 | 20 | — | 22 |
|  |  | 50 | 22 | 28.5 |
|  |  | 100 | 37 | 42 |
| 46 | 500 | 50 | 38.70 | — |
| 49 | >1000 | 10 | 37.30 | — |
| 51 | >500 | 20 | 27 | 28 |
|  |  | 50 | 43 | 37 |
|  |  | 100 | 64 | 46 |

In the granuloma pellet test, the compounds maintained the same level of activity in adrenalectomized rats.

The anti-inflammatory activity was also confirmed by testing the compounds in adjuvant-induced arthritis in rats according to the method of B. B. Newbould, Brit, J. Pharmacol. 21, 127, 1,963. Another characteristic of these compounds is a very low ulcerogenic power. The ulcerogenic ED₅₀ values on stomach and small intestine of rats (dose at which 50 per cent of the rats had gastric or intestinal lesions) of representative compounds was determined according to the method of D. A. Brodie et al., Science, 170, 183, 1,970 and were found to be considerably higher than those of known anti-inflammatory agents such as acetylsalicyclic acid or phenylbutazone.

While the preferred routes of administration are oral and rectal, parenteral administration can also be employed. For oral administration, the compounds are compounded into pharmaceutical dosage forms such as, for example, tablets, capsules, elixirs, solutions and the like. The dosage unit may contain usual excipients such as, for example, starch, gums, alcohols, sugars, fatty acids, etc. For rectal administration, the compounds are administered in the form of suppositories, admixed with conventional vehicles such as, for example, cocoa butter, wax, spermaceti or polyoxyethylene glycols and their derivatives. The dosage range is from about 0.05 to about 2.00 g. per day, preferably administered in divided doses.

Representative compounds which are prepared by procedures herein described include the following:

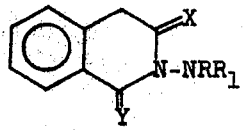

| X | Y | R | R₁ |
|---|---|---|---|
| H₂ | O | H | 2-carboxyphenyl |
| H₂ | O | H | 2-aminobenzoyl |
| O | H₂ | H | 2-aminobenzoyl |
| H₂ | O | H | SO₂CF₃ |

| | | | |
|---|---|---|---|
| H₂ | O | H | cyclohexyl |
| O | H₂ | H | cyclopentyl |
| O | H₂ | H | cyclopropyl |
| H₂ | O | H | nicotinoyl |
| H₂ | O | H | -(CH₂)₄-N(C₂H₅)(C₂H₅) |
| O | H₂ | H | -(CH₂)₃-N(CH₃)(CH₃) |
| O | H₂ | H | -(CH₂)₂-COOH |
| H₂ | O | H | -CH₂-COOC₂H₅ |
| O | H₂ | H | -C(=NH)-NH₂ |
| H₂ | O | H | -C(=NH)-NH₂ |

DETAILED DESCRIPTION OF THE INVENTION

The following representative examples additionally describe the manner and process of making and using the invention to enable the art skilled to make and use the same, and set forth best modes contemplated by the inventors of carrying out the invention. The examples are not intended to limit the scope of the invention, which is defined in the claims.

EXAMPLE 1:
2-Amino-3,4-dihydroisoquinoline-1(2H)-one

A quantity of 140 g. of 2-(2-chloroethyl)benzoyl chloride is added dropwise to 500 ml. of ethanol with external cooling. The resulting solution of ethyl 2-(2-chloroethyl)benzoate is added to a mixture of 350 g. of hydrazine hydrate and 280 ml. of ethanol. The resulting reaction mixture is maintained at the boiling point for 15 hours. The solvent is then removed in vacuo and the residue is extracted with chloroform. After separating the hydrazine layer, the chloroform solution is dried over Na₂SO₄ and evaporated to dryness. The oily residue is dissolved in dilute hydrochloric acid, the acid solution is washed with chloroform, sodium carbonate is added to alkaline reaction and the mixture is extracted with chloroform. After distilling off the chloroform, the residue is distilled and the fraction boiling at 130°-134°C./0.7 mm Hg is collected to give a yield of the titular product of 76 g. (68 percent). The hydrochloride, which is formed by treating the free base with a solution of hydrogen chloride in ethyl ether, has an m.p. of 166°-169°C.

EXAMPLE 2:
2-Amino-1,4-dihydroisoquinoline-3(2H)-one

To a room temperature solution of 20 ml. of hydrazine hydrate in 80 ml. of ethanol is added dropwise 10 g. of ethyl-2-bromoethyl-phenylacetate in 20 ml. of ethanol. The mixture is refluxed for 2.5 hours. The solvent is distilled off in vacuo, the residue is dissolved in methylene dichloride and the solution is washed with water, dried over Na₂SO₄ and evaporated to dryness in vacuo. Yield 5.3 g. (84 percent); m.p. 115°-117°C. The hydrochloride has an m.p. of 198°-201°C.

EXAMPLE 3:
2-[(1-Carbethoxyethylidene)amino]-3,4-dihydroisoquinoline-1(2H)-one To 7 g. of 2-amino-3,4-dihydroisoquinoline-1(2H)-one in 10 ml. of ethanol is added 5.1 g. of ethyl pyruvate in 10 ml. of ethanol. After standing for 6 hours, the solution is evaporated to dryness and the residue is taken up in a mixture of diethyl ether and hexane. The solids are collected and recrystallized from a mixture of diisopropyl ether and hexane. Yield 8.3 g. (73 percent); m.p. 98°-99°C.

EXAMPLES 4 to 12

By procedures for the preparation of Schiff bases similar to that described in Example 3, substituting the indicated starting compound in place of ethyl pyruvate, the benzylidene derivatives of 2-amino-3,4-dihydroisoquinoline-1(2H)-one of the following compounds are prepared. Starting compound, m.p. of the product and yield are given.

| | Starting Compound | M.P.°C. | YIELD % |
|---|---|---|---|
| 4. | Benzaldehyde | 118-119 | 87 |
| 5. | 4-Methylbenzaldehyde | 144-146 | 73 |
| 6. | 4-Chlorobenzaldehyde | 154-156 | 74 |
| 7. | Salicylaldehyde | 204-205 | 85 |
| 8. | 3,4-Dichlorobenzaldehyde | 172-174 | 80 |
| 9. | 2-Chlorobenzaldehyde | 124-126 | 76 |
| 10. | 3-Chlorobenzaldehyde | 151-153 | 82 |
| 11. | 4-Methoxybenzaldehyde | 134-136 | 90 |
| 12. | 3-Methylbenzaldehyde | 112-114 | 76 |

EXAMPLES 13 to 15

By procedures for the preparation of Schiff bases similar to that described in Example 3, substituting the indicated starting compound for ethyl pyruvate and the 1,4-dihydroisoquinoline reactant for the 3,4-dihydroisoquinoline reactant, the benzylidene derivatives of 2-amino-1,4-dihydroisoquinoline-3(2H)-one are prepared. Starting compound, m.p. of the product and yield are given.

| | Starting Compound | M.P.°C. | Yield % |
|---|---|---|---|
| 13. | 4-Chlorobenzaldehyde | 200-3 | 93 |
| 14. | 4-Methylbenzaldehyde | 146-8 | 76 |
| 15. | 3,4-Dichlorobenzaldehyde | 213-5 | 94 |

EXAMPLE 16:
2-(4-Chlorobenzamido)-3,4-dihydroisoquinoline-1(2H)-one

To a solution of 5 g. of 2-amino-3,4-dihydroisoquinoline-1(2H)-one and 3.2 g. of triethylamine in 100 ml. of diethyl ether maintained at 10°-15°C. is added dropwise 5.4 g. of 4-chlorobenzoyl chloride in 50 ml. of diethyl ether. The resulting precipitate is collected, carefully washed with water and recrystallized from dimethylformamide. Yield 6.5 g. (72 percent); m.p. 272°-273°C.

EXAMPLES 17–24

Similarly to the process as described in Example 16, amides were prepared by reacting 2-amino-3,4-dihydro-isoquinoline-1(2H)-one and one of the following acyl chlorides. Yields and melting points are given.

|  | Starting Compound | M.P.°C. | Yield % |
|---|---|---|---|
| 17. | Acetyl chloride | 223–225 | 86 |
| 18. | Benzoyl chloride | 242–244 | 94 |
| 19. | 3,4,5-Trimethoxybenzoyl chloride | 194–196 | 80 |
| 20. | Salicyloyl chloride | 204–206 | 76 |
| 21. | 4-Methylbenzoyl chloride | 267–9 | 82 |
| 22. | 3,4-Dichlorobenzoyl chloride | 252–5 | 92 |
| 23. | Methanesulfonyl chloride | 125–7 | 80 |
| 24. | Benzenesulfonyl chloride | 195–7 | 94 |

EXAMPLE 25:
2-Benzylamino-3,4-dihydroisoquinoline-1(2H)-one

To a boiling solution of 10 g. of 2-benzylideneamino-3,4-dihydroisoquinoline-1(2H)-one in 100 ml. of methanol is gradually added 4.0 g. of sodium borohydride and the mixture is refluxed for 5 hours. After cooling, acetic acid is added to acidic reaction and the mixture is concentrated to dryness in vacuo. After adding a methylene dichloro-acetone mixture, the solids are filtered off and the filtrate is evaporated to dryness in vacuo. The residue is distilled and the fraction distilling at 135°–145°C./0.5 mm Hg is collected. Yield 7.2 g. (72 percent). The hydrochloride has an m.p. of 183°–186°C.

EXAMPLE 26:
2-Bis-(2-hydroxyethyl)-amino-3,4-dihydroisoquinoline-1(2H)-one

A solution of 35 g. of ethylene oxide and 10 g. of 2-amino-3,4-dihydroisoquinoline-1(2H)-one in 100 ml. of methanol is heated in a closed vessel at 100°C. for 6 hours. After evaporation of the solvent in vacuo, the residue is distilled and the fraction distilling at 180°–220°C./0.6 mm Hg is collected. The distillate is dissolved in ethanol and diluted with a diethyl ether solution of hydrogen chloride. The precipitated hydrochloride has an m.p. of 180°–181°C. Yield 66 percent. The free base has an m.p. of 124°–127°C.

EXAMPLE 27:
2-Dimethylamino-3,4-dihydroisoquinoline-1(2H)-one

A mixture of 5 g. of 2-amino-3,4-dihydroisoquinoline-1(2H)-one, 6.4 ml. of formic acid 90%, 5.1 g. of formaldehyde 40 percent is refluxed for 8 hours. After cooling and adding one ml. of hydrochloric acid, the solution is evaporated to dryness in vacuo. To the residue, an aqueous sodium carbonate solution is added and the solution is extracted with methylene dichloride. After removing the solvent, the residue is distilled in vacuo and the fraction distilling at 130°C./0.5 mm Hg is collected. Yield 4 g. (70 percent). The hydrochloride has an m.p. of 179°–181°C.; the sulfate has an m.p. of 226°–228°C.

EXAMPLE 28:
2-Phenylcarbamido-3,4-dihydroisoquinoline-1-(2H)-one

A mixture of 7 g. of 2-amino-3,4-dihydroisoquinoline-1(2H)-one, 5.14 g. of phenyl isocyanate and 40 ml. of ethanol is allowed to stand one hour at room temperature. The precipitate is collected, washed with ethanol and diethyl ether and dried. Yield 10 lg. (90 percent), m.p. 229°–231°C.

EXAMPLE 29:
2-Phenylthiocarbamido-3,4-dihydroisoquinoline-1(2H)-one

The procedure of Example 28 is repeated, substituting phenyl isothiocyanate in place of phenyl isocyanate. The product 2-phenylthiocarbamido-3,4-dihydroisoquinoline-1(2H)-one is thereby obtained. Yield 90 percent, m.p. 180°–182°C.

EXAMPLE 30:
2-Benzamido-1,4-dihydroisoquinoline-3(2H)-one

To a solution of 5 g. of 2-amino-1,4-dihydroisoquinoline-3(2H)-one in 60 ml. of dioxane and 30 ml. of ethyl ether is added dropwise 4.4 g. of benzoyl chloride in 20 ml. of diethyl ether and the mixture is stirred 2 hours at room temperature. After filtering, the collected solid is washed carefully with water, dried and recrystallized from acetone. Yield 6 g. (68.5 percent); m.p. 205°–207°C.

EXAMPLES 31 to 37

Similarly to the procedure as described in Example 30, the indicated amides of 2-amino-1,4-dihydroisoquinoline-3(2H)-one are prepared by substituting the following starting compounds in place of benzoyl chloride. Yields and melting points are given for the said amides.

|  | Starting Compound | M.P.°C. | Yield % |
|---|---|---|---|
| 31. | Acetyl chloride | 144–147 | 76 |
| 32. | 4-Chlorobenzoyl chloride | 249–251 | 81 |
| 33. | 3,4-Dichlorobenzoyl chloride | 268–271 | 96 |
| 34. | Methanesulfonyl chloride | 158–160 | 74 |
| 35. | Benzene sulfonyl chloride | 188–190 | 93 |

36. By using more than two molar proportions of benzene sulfonyl chloride per molar proportion of 2-amino-1,4-dihydroisoquinoline-3(2H)-one, 2-bis(benzenesulfonyl)amino-1,4-dihydroisoquinoline-1,4-dihydroisoquinoline-3(2H)-one is obtained. Yield 95 percent; m.p. 204°C.

37. The acetamide product is also prepared using acetic anhydride in the presence of pyridine. When an excess of acetic anhydride and a boiling water bath is used, the N,N-diacetyl derivative is obtained; m.p. 102°–103°C.

EXAMPLE 38:
2-Benzylideneamino-1,4-dihydroisoquinoline-3(2H)-one

The compound is prepared by reacting benzaldehyde with 2-amino-1,4-dihydroisoquinoline-3(2H)-one, as indicated above. Yield 86 percent; m.p. 170°–171°C.

EXAMPLE 39:
2-Carbamido-1,4-dihydroisoquinoline-3(2H)-one

To a suspension of 1.62 g. of 2-amino-1,4-dihydroisoquinoline-3(2H)-one in 25 ml. of water also containing 0.011 mole of HCl and heated to 45°C., one g. of sodium isocyanate is added. After 10 minutes, the precipitate is collected and dried. Yield 1.8 g. (88 percent); m.p. 204°–206°C.

EXAMPLE 40:
2-Phenylcarbamido-1,4-dihydroisoquinoline-3(2H)-one

To a suspension of 1.62 g. of 2-amino-1,4-dihydroisoquinoline-3(2H)-one in 32 ml. of benzene is added 1.2 g. of phenyl isocyanate. The temperature of the mixture spontaneously rises to about 50°–60°C. After cooling, the resulting precipitate is collected and washed with diethyl ether and recrystallized from ethanol. Yield 2.25 g. (80 percent); m.p. 220°–223°C.

EXAMPLE 41:
2-(4-Methyl-1-piperazinyl)-3,4-dihydroisoquinoline-1(2H)-one

A mixture of 180 g. of 1-isochromanone and 225 g. of phosphorous pentachloride is gradually heated up to 155°C. and maintained at this temperature for about 30 minutes by distilling off phosphorus oxychloride. The oily residue is distilled at 145°–150°C./17 mm Hg giving 188.5 g. (75 percent) of 2-(2-chloroethyl)benzoyl chloride. An amount of 24 g. of this latter compound is added under stirring to a solution of 12.5 g. of 1-amino-4-methylpiperazine and 22 g. of triethylamine in 150 ml. of ethyl ether. The mixture is maintained at room temperature for about 30 minutes. After concentration of the solution to a small volume, the resulting solid precipitate is collected on a filter, washed with water then with an aqueous solution of sodium bicarbonate. The residue is extracted with dichloromethane and after drying over $Na_2SO_4$ and evaporation of the solvent, 24 g. (73 percent) of crude 1-[2-(2-chloroethyl)-benzamido]-4-methyl piperazine is obtained. The purified product after crystallization from diethyl ether melts at 139°–141°C. To 18 grams of the so-obtained piperazine compound in 500 ml. of acetonitrile, 3.1 g. of sodium hydride is added at room temperature and the mixture is stirred for 3 hours. The resulting solid precipitate is filtered off and the organic layer is evaporated to dryness. The residue is dissolved in diethyl ether and precipitated by addition of hydrogen chloride. The recovered hydrochloride is suspended in an aqueous solution of sodium bicarbonate and extracted with dichloromethane. The organic layer after drying gives 9 g. of the titular compound, m.p. 100°–101°C.

EXAMPLE 42:
2-Morpholino-3,4-dihydroisoquinoline-1(2H)-one

By reacting 4.4 g. of 2-(2-chloroethyl)-benzoyl chloride and 4.4 g. of triethylamine with 2.2 g. of 4-aminomorpholine similarly to the reaction with 1-amino-4-methyl piperazine as described in the previous example, 2.9 g. of 2-[2-(2-chloroethyl)-benzamido]-morpholine is obtained which melts at 132°–135°C. A mixture of one g. of the so-obtained morpholine derivative and 2.1 g. of potassium hydroxide in 25 ml. of acetone is refluxed for 30 minutes and the resulting solid precipitate is filtered off and the organic layer evaporated to dryness. The residue is extracted with dichloromethane and the resulting solution is washed with water. The organic layer on evaporation gives 0.4 g. of the titular compound which melts at 132°–133°C.

EXAMPLE 43:
2-Phenylamino-3,4-dihydroisoquinoline-1(2H)-one

Similarly to the procedure described in Example 41, 9.5 g. of N-phenyl-N'-[2-(2-chloroethyl)benzoyl]hydrazine, m.p. 172°–174°C., is prepared and is cyclized to the titular compound by treatment with sodium hydride according to the procedure described earlier. Yield 5.5 g., m.p. 160°–163°C.

EXAMPLE 44:
2-Piperidino-3,4-dihydroisoquinoline-1(2H)-one

A mixture of 3.4 g. of 2-amino-3,4-dihydroisoquinoline-1(2H)-one, 4.6 g. of 1,5-dibromopentane and 1.27 g. of $Na_2CO_3$ in 80 ml. of 50 percent aqueous ethanol is refluxed for 16 hours. The reaction mixture is then evaporated to dryness and the residue is washed with water and extracted with dichloromethane. The resulting solution is chromatographed on a silica gel column by eluting with chloroform. Yield 2.5 g., m.p. 90°–92°C. The hydrochloride melts at 198°–201°C.

EXAMPLE 45:
2-Pyrrolidino-3,4-dihydroisoquinoline-1(2H)-one hydrochloride

The titular compound is prepared by a procedure similar to that of Example 44, substituting 1,4-dibromobutane in place of 1,5-dibromopentane. The hydrochloride is obtained by addition of hydrogen chloride to an ethyl ether solution of the base. Its m.p. is 209°–211°C.

EXAMPLE 46:
2-Dimethylamino-1,4-dihydroisoquinoline-3(2H)-one

A solution of 81 g. of N,N-dimethylhydrazine in 10 ml. of dry ethanol is added to 100 g. of 3-isochromanone in 500 ml. of dry ethanol at room temperature. After boiling for 14 hours, the resulting solution is evaporated to dryness and the residue is crystallized from a mixture of ethanol and ethyl ether, yielding 80 g. of N-(2-hydroxymethylphenyl)acetyl-N',N'-dimethylhydrazine, m.p. 99°–100°C. A solution of 33 ml. of thionyl chloride in 33 ml. of dichloromethane is added with agitation at room temperature to a solution of 21.5 g. of the previously described hydrazine compound in 250 ml. of dichloromethane. After 30 minutes, the solvent is evaporated in vacuo and the residue extracted with dichloromethane. The organic layer is washed with an aqueous solution of sodium bicarbonate and with water. Upon evaporation of the organic solution, 19.5 g. of N-(2-chloromethylphenyl)acetyl-N',N'-dimethylhydrazine is obtained, m.p. 104°–106°C. An amount of 3 g. of this latter derivative is cyclized to the titular compound by using 0.65 g. of sodium hydride in 75 ml. of dimethoxyethane under the same conditions as described in the last part of Example 41. The residue obtained by evaporation of the solvent is distilled at 124°C./0.4 mm Hg., yielding 2 g. of 2-dimethylamino-1,4-dihydroisoquinoline-3(2H)-one. The hydrochloride obtained by addition of hydrogen chloride to an ethyl ether solution of the base, melts at 176°–178°C. The cyclization step may also be carried out by using finely subdivided potassium hydroxide in acetone instead of sodium hydride in dimethoxyethane.

EXAMPLE 47:
2-(N-Methyl-N-benzenesulfonyl)amino-1,4-dihydroisoquinoline-3(2H)-one Three grams of 2-benzenesulfamido-1,4-dihydroisiquinoline-3(2H)-one is dissolved in 7.5 ml. of aqueous 10 percent NaOH and 30 ml. of water at 70°C. and, after cooling to room temperature, 1 ml. of dimethyl sulfate is added to the solution. The mixture is stirred for one additional hour, and then 1 ml. of dimethyl sulfate is added. Stirring is continued for 1 hour followed by further addition of 1 ml. of dimethyl sulfate. The reaction mixture is then allowed to stand over night and the resulting precipitate is collected on a filter and crystallized from methanol. Yield 95 percent, m.p. 93°–95°C.

EXAMPLE 48:
2-(N-Methyl-N-benzenesulfonyl)amino-3,4-dihydroisoquinoline-1(2H)-one The titular compound is prepared according to the same procedure described in the foregoing example, substituting the 3,4-dihydroisoquinoline-1(2H)-one for the 1,4-isomer. Yield 86 percent, m.p. 136°–138°C.

EXAMPLE 49:
2-Methylamino-3,4-dihydroisoquinoline-1(2H)-one

Two grams of the compound of the previous example is added to 8 ml. of concentrated sulfuric acid. After 6 hours, 80 ml. of anhydrous ethyl ether is added to the reaction mixture and the precipitate which forms is collected, treated with aqueous sodium carbonate and extracted with dichloromethane solution. After evaporation in vacuo of the solvent, the residual titular product, 0.8 g., m.p. 80°–81°C., is recovered.

EXAMPLE 50:
2-Methylamino-1,4-dihydroisoquinoline-3(2H)-one

The titular compound is prepared according to the method of the foregoing example, substituting the compound of Example 47 as starting material in place of the compound of Example 48. Yield 75 percent, m.p. 70°–71°C.

EXAMPLE 51:
2-Allylamino-3,4-dihydro-isoquinoline-1(2H)-one hydrochloride

Twenty-five grams of 2-(N-allyl-N-benzenesulfonyl)-amino-3,4-dihydro-isoquinoline-1(2H)-one in 100 ml. of concentrated sulfuric acid is maintained at room temperature for about 4 hours. The mixture is then poured into about 200 g. of crushed ice and neutralized by addition of 120 g. of $Na_2CO_3$ and 150 ml. of concentrated ammonium hydroxide. After extraction with ethyl ether, the organic layer is evaporated and the liquid residue distilled under vacuum at 125°C./0.6 mm Hg. Yield 11 g. By treatment of an ethyl ether solution of the product with dry hydrogen chloride, the hydrochloride obtained; m.p. 156°–158°C.

EXAMPLE 52:
(3-Phenyl-2-propen-1-ylidene)amino-3,4-dihydro-isoquinoline-1(2H)-one To five grams of 3,4-dihydroisoquinoline-1(2H)-one dissolved in 10 ml. of dry ethanol, 4.1 g. of cinnamic aldehyde in 5 ml. of dry ethanol is added. After 2 hours, the titular product precipitates. It is recovered on the filter and triturated with ethanol:ethyl ether 1:1 M.p. 134°–136°C., yield 7.4 g.

EXAMPLE 53:
2-(N-Allyl-N-benzenesulfonyl)amino-3,4-dihydroisoquinoline-1(2H)-one Thirty grams of 2-benzenesulfonamido-3,4-dihydroisoquinoline-1(2H)-one is dissolved at 60°C. in 180 ml. of aqueous 5 percent sodium hydroxide. To the hot solution 9.6 ml. of allyl bromide is added, followed, after 30 minutes, by an additional 8.6 ml. of the same reagent. After 1 hour at 60°C., the solution is cooled and extracted with dichloromethane. The organic layer is washed with water, dried and evaporated, giving an oily product which is crystallized several times from light petroleum to give the titular product. Yield 32 g. (94 percent); m.p. 100°–101°C.

EXAMPLE 54:
2-[N-(3-Methyl-2-butenyl)-N-benzenesulfonyl]-amino-3,4-dihydroisoquinoline-1(2H)-one Pursuant to the procedure of the foregoing example and utilizing 1-bromo-3-methyl-2-butene instead of allyl bromide, the title product is obtained in a 92 percent yield. M.p. 99°–110°C.

EXAMPLE 55:
2-[N-Cinnamyl-N-benzenesulfonyl]amino-3,4-dihydroisoquinoline-1(2H)-one The title compound is prepared according to the procedure of Example 53 but using cinnamyl bromide instead of allyl bromide. M.p. 100°–102°C.

EXAMPLE 56:
2-Cinnamylamino-3,4-dihydro-isoquinoline-1(2H)-one

To 4 g. of 2-amino-3,4-dihydro-isoquinoline-1(2H)-one hydrochloride in 40 ml. of dioxane add 5.7 g. of triethylamine and 3.1 g. of cinnamyl chloride. After refluxing for 1½ hours, the reaction mixture is cooled and triethylamine salts are filtered off. The filtrate is evaporated to dryness. The residue is dissolved in dichloromethane and the solution is washed with water and then evaporated in vacuo. The residue is chromatographed through a silica gel column by eluting with benzene containing 5 percent of ethyl acetate. The first fractions which contain a small amount of disubstituted compound are discarded. Evaporation of the subsequent fractions gives 2.2 g. (39 percent) of the title compound which melts at 72°–74°C.

EXAMPLE 57:
2-Proparygylamino-3,4-dihydro-isoquinoline-1(2H)-one hydrochloride Pursuant to the procedure of Example 56, but using propargyl bromide instead of cinnamyl chloride, the crude title product is obtained. The compound is purified by distillation at 125°–130°C./0.4 mm Hg. Yield 20 percent. The hydrochloride is formed by adding dry hydrogen chloride to an ethyl ether solution of the base. It melts at 162°–166°C.

EXAMPLE 58: a.
2-(2-Butenyl)amino-3,4-dihydro-isoquinoline-1(2H)-one b. 2-Bis(2-butenyl)amino-3,4-dihydro-isoquinoline-1(2H)-one By proceding essentially as described in Example 56 and reacting 6 g. of 2-amino-3,4-dihydro-isoquinoline-1(2H)-one hydrochloride with 6.1 g. of 1-bromo-2-butene, 6 g. of a crude product is obtained which is cromatographed through a silica gel column by eluting with benzene:ethyl acetate 80:20. The first fractions, after evaporation, give 0.2 g. of 2-bis(2-butenyl)amino-3,4-dihydroisoquinoline-1(2H)-one; m.p. 135°–140°C./0.5 mm Hg. The following fractions give 3 g. of 2-(2-butenyl)amino-3,4-dihydroisoquinoline-1(2H)-one boiling at 130°–135°C./0.5 mm Hg.

EXAMPLE 59: a.
2-Allylamino-3,4-dihydro-isoquinoline-1(2H)-one b. 2-Diallylamino-3,4-dihydro-isoquinoline-1(2H)-one Pursuant to the procedure of Example 58 but employing allyl bromide instead of 1-bromo-2-butene, the following compounds are obtained:
  a. 2-allylamino-3,4-dihydro-isoquinoline-1(2H)-one, b.p. 125°C./0.6 mm Hg.
  b. 2-diallylamino-3,4-dihydro-isoquinoline-1(2H)-one, b.p. 127°–130°C./0.9 mm Hg.

EXAMPLE 60:
2-(2-Methyl-2-propenyl)amino-3,4-dihydroisoquinoline-1(2H)-one

Pursuant to the procedure of Example 56 and reacting 12 g. of 2-amino-3,4-dihydro-isoquinoline-1(2H)-one hydrochloride with 9.7 ml. of 1-bromo-2-methyl-2-propene, 3.5 g. of the title product is obtained which boils at 128°–134°C./0.6 mm Hg.

Other representative compounds which are prepared by procedures herein described include the following:

2-(3-Methyl-2-butenyl)amino-3,4-dihydroisoquinoline-1(2H)-one
2-Allylamino-1,4-dihydroisoquinoline-3(2H)-one
2-Cinnamylamino-1,4-dihydroisoquinoline-3(2H)-one
2-(2-Cyclopentenyl)amino-3,4-dihydroisoquinoline-1(2H)-one
2-(2-Cyclohexenyl)amino-3,4-dihydroisoquinoline-1(2H)-one

What is claimed is:
1. A compound represented by the formula

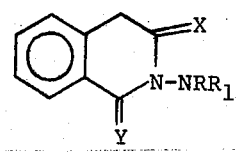

wherein X and Y are different and represent $H_2$ or oxygen; R and $R_1$ independently represent a member from the group consisting of hydrogen, lower alkyl, hydroxy-lower alkyl, amino-lower alkyl, mono- and di-lower alkylamino-lower alkyl, carboxy-lower alkyl, carboalkoxy-lower alkyl, cycloalkyl, lower alkenyl, cycloalkenyl, phenyl, substituted phenyl, phenyl lower alkyl, phenyl lower alkenyl, lower alkynyl; acyl derived from a lower alkyl, a phenyl or a heterocyclic carboxylic acid moiety; carbamyl, thiocarbamyl, phenylcarbamyl, phenylthiocarbamyl, guanyl, phenylsulfonyl, lower alkylsulfonyl or halo lower alkylsulfonyl; or, R and $R_1$ together with the adjacent nitrogen atom, represent a phenyl lower alkenylideneamino, phenyl lower alkylideneamino, substituted phenyl lower alkylideneamino, lower alkylideneamino, carboxy lower alkylideneamino, carbalkoxy lower alkylideneamino or cycloalkylideneamino group or form a heterocyclic ring therewith of the group consisting of 4-methyl-1-piperazino, morpholino, piperidino and pyrrolidino; and pharmaceutically acceptable addition salts thereof.

2. The compound of claim 1 which is 2-amino-3,4-dihydroisoquinoline-1(2H)-one.

3. The compound of claim 1 which is 2-benzylideneamino-3,4-dihydroisoquinoline-1(2H)-one.

4. The compound of claim 1 which is 2-[(3,4-dichlorobenzylidene)-amino]-3,4-dihydroisoquinoline-1(2H)-one.

5. The compound of claim 1 which is 2-(3,4-dichlorobenzamide)-3,4-dihydroisoquinoline-1(2H)-one.

6. The compound of claim 1 which is 2-acetamido-1,4-dihydroisoquinoline-3(2H)-one.

7. The compound of claim 1 which is 2-benzylideneamino-1,4-dihydroisoquinoline-3(2H)-one.

8. The compound of claim 1 which is 2-dimethylamino-1,4-dihydroisoquinoline-3(2H)-one.

9. The compound of claim 1 which is 2-methylamino-3,4-dihydroisoquinoline-1(2H)-one.

10. The compound of claim 1 which is 2-allylamino-3,4-dihydroisoquinoline-1(2H)-one hydrochloride.

* * * * *

PO-1050
(5/69)

UNITED STATES PATENT OFFICE
CERTIFICATE OF CORRECTION

Patent No. 3,846,412             Dated November 5, 1974

Inventor(s) G. Nathansohn; G. Winters; G. Odasso

It is certified that error appears in the above-identified patent and that said Letters Patent are hereby corrected as shown below:

In the Abstract, cancel the first three lines immediately following the formula;

In the Abstract, the seventh line from the bottom, correct spelling of "carbalkoxy";

Column 4, line 25, change "1,963" to -- 1963 --;

Column 4, line 31, change "1,970" to -- 1970 --;

Column 8, line 6, delete the "1" in "1g.";

Signed and sealed this 24th day of June 1975.

(SEAL)
Attest:

RUTH C. MASON
Attesting Officer

C. MARSHALL DANN
Commissioner of Patents
and Trademarks